(12) United States Patent
   Walsh

(10) Patent No.: US 9,876,407 B2
(45) Date of Patent: Jan. 23, 2018

(54) HALBACH MOTOR AND GENERATOR

(71) Applicant: Raymond James Walsh, Dallas, TX (US)

(72) Inventor: Raymond James Walsh, Dallas, TX (US)

( * ) Notice: Subject to any disclaimer, the term of this patent is extended or adjusted under 35 U.S.C. 154(b) by 717 days.

(21) Appl. No.: 14/185,910

(22) Filed: Feb. 20, 2014

(65) Prior Publication Data

US 2015/0171694 A1    Jun. 18, 2015

Related U.S. Application Data

(60) Provisional application No. 61/766,705, filed on Feb. 20, 2013, provisional application No. 61/891,829, filed on Oct. 16, 2013, provisional application No. 61/892,019, filed on Oct. 17, 2013, provisional application No. 61/894,489, filed on Oct. 23, 2013, provisional application No. 61/895,115, filed on Oct.
(Continued)

(51) Int. Cl.

| | |
|---|---|
| *H02K 49/10* | (2006.01) |
| *H02K 16/02* | (2006.01) |
| *H02K 3/47* | (2006.01) |
| *H02K 21/12* | (2006.01) |
| *H02K 21/26* | (2006.01) |
| *H02K 29/03* | (2006.01) |
| *H02K 29/12* | (2006.01) |
| *H02K 3/46* | (2006.01) |
| *H02K 7/08* | (2006.01) |
| *H02K 7/11* | (2006.01) |
| *H02K 16/00* | (2006.01) |

(52) U.S. Cl.
   CPC ............... *H02K 3/47* (2013.01); *H02K 3/46* (2013.01); *H02K 7/08* (2013.01); *H02K 7/11* (2013.01); *H02K 16/00* (2013.01); *H02K 16/02* (2013.01); *H02K 21/12* (2013.01); *H02K 21/26* (2013.01); *H02K 29/03* (2013.01); *H02K 29/12* (2013.01); *H02K 49/106* (2013.01)

(58) Field of Classification Search
   CPC ..... H02K 16/02; H02K 16/025; H02K 49/106
   USPC ................... 310/114, 266, 103, 104, 156.01
   IPC ..................................................... H02K 16/02
   See application file for complete search history.

(56) References Cited

U.S. PATENT DOCUMENTS

| 1,069,291 | A | 8/1913 | Rhodes |
| 1,071,847 | A | 9/1913 | Wilson |

(Continued)

*Primary Examiner* — Thomas Truong
(74) *Attorney, Agent, or Firm* — Jack D. Stone, Jr.; Scheef & Stone, L.L.P.

(57) ABSTRACT

A motor includes two magnetically coupled, coaxially-nested Halbach cylinder rotors, one of which passes through a toroidal series of at least two stator coils while the other is attached to an axle or other means of transferring mechanical power. An embodiment is described comprising an additional third Halbach cylinder rotor in which a circumferential arrangement of permanent magnets is mounted rotatably and proximally outside the stator coils, coaxial with the stator coils. Adjacent stator coils are configured so as to produce opposing magnetic fields upon energizing of the motor. Alternating the current to the stator coils induces movement in the rotor. Commutation can occur brushlessly, or the motor can be configured to function without commutation by varying the frequency of the alternating current, and can be configured to operate by either DC or AC current. Alternatively, the rotor may be driven to generate an electric current in the stator.

29 Claims, 11 Drawing Sheets

Related U.S. Application Data

24, 2013, provisional application No. 61/899,204, filed on Nov. 2, 2013, provisional application No. 61/906,136, filed on Nov. 19, 2013, provisional application No. 61/906,703, filed on Nov. 20, 2013.

(56) References Cited

U.S. PATENT DOCUMENTS

| | | |
|---|---|---|
| 1,231,193 A | 6/1917 | Powers |
| 4,104,548 A | 8/1978 | Borello |
| 4,214,178 A | 7/1980 | Tippner |
| 4,381,181 A | 4/1983 | Clegg |
| 4,391,248 A | 7/1983 | Latsch |
| 4,656,376 A * | 4/1987 | Hyldal ............... H02K 29/06 310/20 |
| 4,731,554 A * | 3/1988 | Hall ............... H02K 29/08 310/156.26 |
| 5,783,894 A * | 7/1998 | Wither ............... H02K 21/12 310/156.26 |
| 6,252,317 B1 | 6/2001 | Scheffer et al. |
| 6,762,520 B1 * | 7/2004 | Ehrhart ............... H02K 1/20 310/208 |
| 7,462,968 B2 | 12/2008 | Kusase et al. |
| 8,183,731 B2 | 5/2012 | Epstein et al. |
| 2006/0138879 A1 * | 6/2006 | Kusase ............... B60K 7/0007 310/67 R |
| 2007/0029889 A1 | 2/2007 | Dunn et al. |
| 2009/0072650 A1 * | 3/2009 | Yoshikawa ............... H02K 16/02 310/156.43 |
| 2010/0052452 A1 | 3/2010 | Yoshino et al. |
| 2012/0235528 A1 | 9/2012 | Axford |
| 2013/0099703 A1 | 4/2013 | Epstein et al. |

* cited by examiner

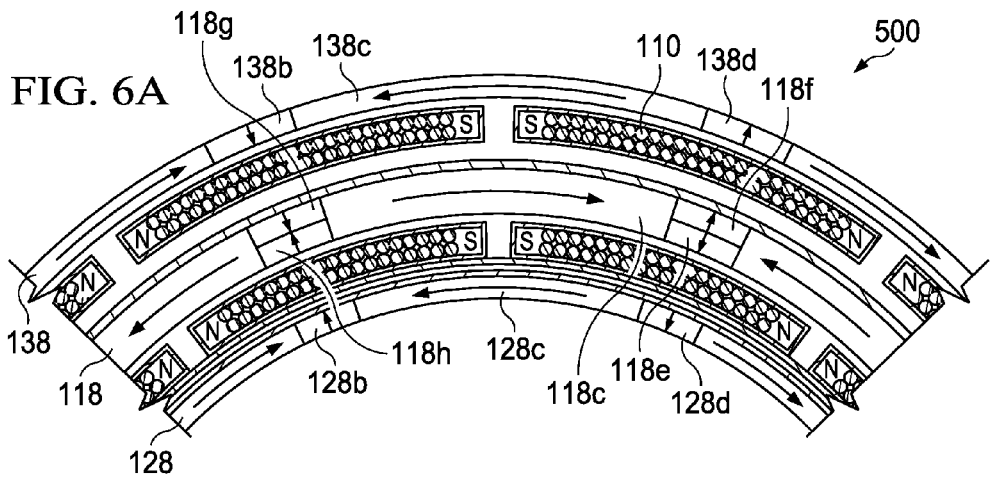
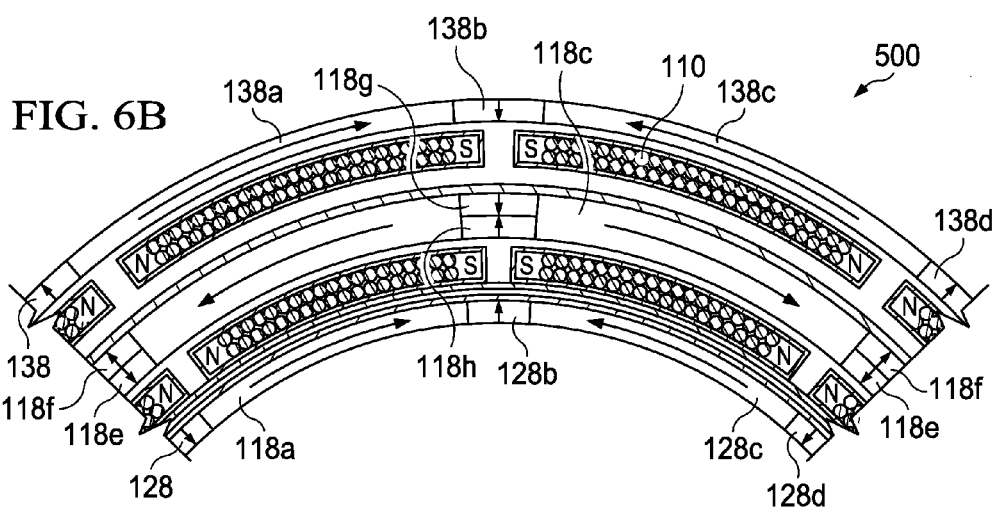
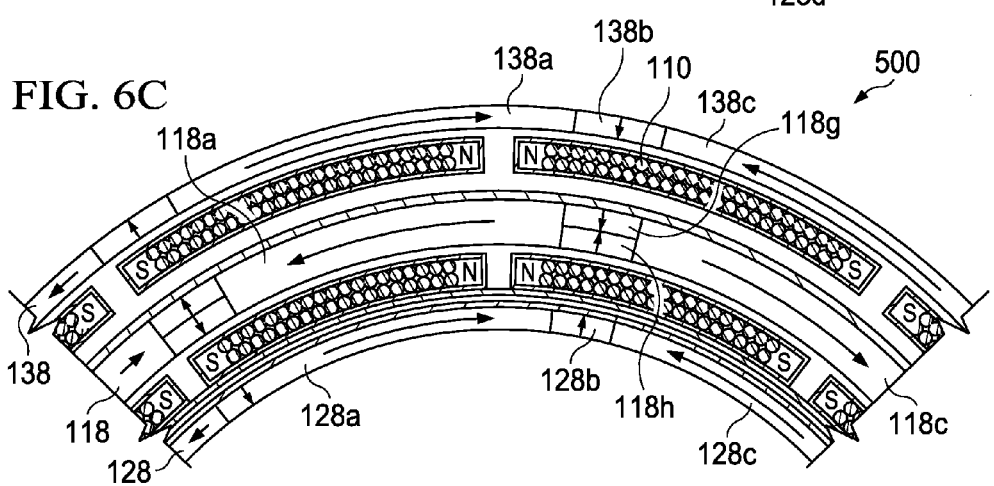

HALBACH MOTOR AND GENERATOR

CROSS-REFERENCE TO RELATED APPLICATIONS

This application claims the benefit of
U.S. Provisional Application No. 61/766,705 filed Feb. 20, 2013,
U.S. Provisional Application No. 61/891,829, filed Oct. 16, 2013,
U.S. Provisional Application No. 61/892,019, filed Oct. 17, 2013,
U.S. Provisional Application No. 61/894,489, filed Oct. 23, 2013,
U.S. Provisional Application No. 61/895,115, filed Oct. 24, 2013,
U.S. Provisional Application No. 61/899,204, filed Nov. 2, 2013,
U.S. Provisional Application No. 61/906,136, filed Nov. 19, 2013, and
U.S. Provisional Application No. 61/906,703, filed Nov. 20, 2013, all of which applications are hereby incorporated herein by reference, in their entirety.

TECHNICAL FIELD

The invention relates generally to electric motors and generators and, more particularly, to electric motors and generators using coaxially nested Halbach cylinders.

BACKGROUND

Conventional rotary coil motors are well-known and have been in existence for well over a century, the basic design feature being a rotor ring with ferromagnetic elements passing through a series of stator coils arranged in a circle. Various methods for transfer of torque have been employed, most commonly using a system of gears, chains, or pulleys. These devices, however, have not enjoyed widespread use.

Subsequent designs and improvements sought to transfer torque by magnetically coupling across a magnetically permeable sealed housing. This advance enabled the movement of fluids without contact between the fluids and vulnerable elements within the motor. Examples include a machine for moving wet cement, another for moving coolant within a nuclear reactor, and a centrifugal pump design.

More recent art replaces the ferromagnetic elements (iron elements which are not magnetic, but which respond to magnetic forces) within the rotor with permanent magnets. Whereas a ferromagnetic element can only be attracted into a coil, a permanent magnet can be simultaneously repelled out of one coil and attracted into the next, provided that the magnetic poles are arranged favorably with respect to the coils. A typical permanent magnet/coil motor incorporates a rotor ring comprising a series of magnets arranged in alternating polarity with spaces or non-magnetic elements between the magnets. This rotor passes through an interrupted series of coils, the interruptions between the coils being necessary for mechanical transfer of power between the rotor and the powertrain. U.S. Pat. No. 6,252,317 to Scheffer et al. discloses such a commutated electric motor with a plurality of permanent magnets on a rotor which passes through coil stators. In this device, torque is transferred by means of teeth on the rotor engaging multiple gear wheels.

While conventional coil motors employ permanent magnet rotors, or magnetic means to transfer torque, there are inherent inefficiencies and deficiencies in such coil motor designs and magnetic means to transfer torque. The most notable among these is the difficulty in transferring mechanical power from a rotor travelling within a set of coils, typically accomplished by means of gears or pulleys making physical contact with the rotor through spaces between the coils. But allowing these spaces limits the number of coils, and hence, the efficiency of the coils, and introduces an element of friction. Secondly, these devices harvest only the magnetic field within the coils whereas considerable magnetic field is also available outside the coils to perform meaningful work when configured appropriately.

Generators, which could be described as the converse of electric motors, also suffer from similar inherent inefficiencies and deficiencies. For example, U.S. Pat. Pub. 2012/0235528A1 to Axford teaches a toroidal inductance generator employing magnets within a toroidal copper coil being induced to move by magnetically coupled magnets external to the coil attached to an internal combustion motor. Design limitations, however, preclude this generator from also functioning as a motor.

In view of the foregoing and also the rising costs of energy, there has been a continuing effort to design a more efficient motor and generator.

SUMMARY

Accordingly, the present invention provides a rotary coil motor having a coaxially-nested double Halbach cylinder rotor configuration, wherein one cylinder rotor passes coaxially through a series of stator coils configured toroidally, while magnetically coupled to a second cylinder rotor rotating outside the stator coils. Such an arrangement utilizes electromotive force to urge each Halbach cylinder and magnetic coupling to transfer torque from the first cylinder rotor to the second cylinder rotor, the second cylinder rotor preferably being coupled to drive rotating equipment.

In a further embodiment, an auxiliary, or tertiary, rotor is configured to rotate about the outer side of the stator coils. The tertiary rotor may optionally be coupled to the first rotor.

In a further variation, the invention is configured as a generator, wherein torque is applied to rotate the second (and optionally tertiary) rotor to generate electrical current in the stator coils.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 6A, 6B, and 6C exemplify operation of the motor and generator of FIG. 5 through a clockwise rotation;

DETAILED DESCRIPTION

Figure 1:
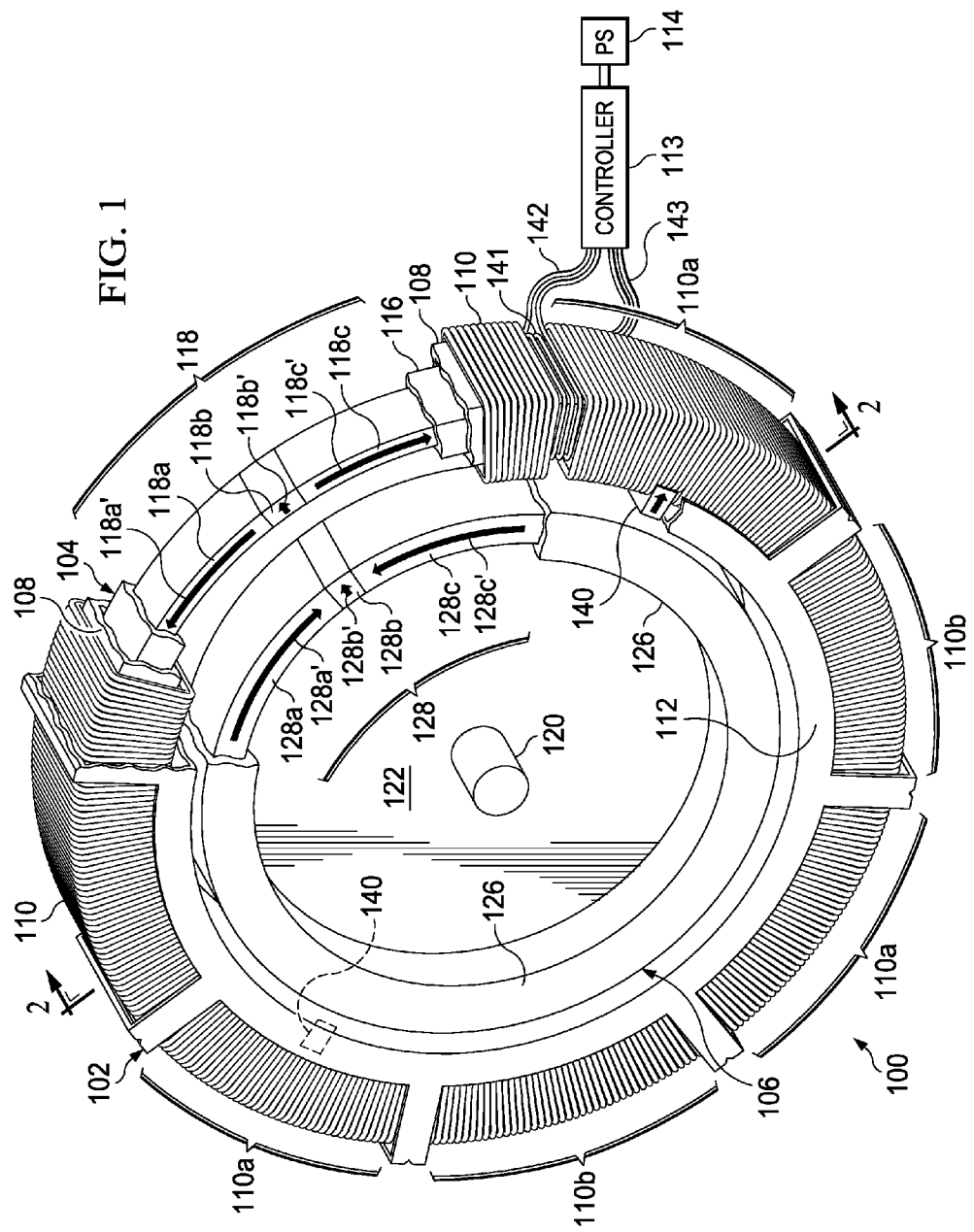
FIG. 1 is a perspective view exemplifying a Halbach motor and generator embodying features of the present invention.

Refer now to the drawings wherein depicted elements are, for the sake of clarity, not necessarily shown to scale and wherein like or similar elements are designated by the same reference numeral through the several views. In the interest of conciseness, well-known elements may be illustrated in schematic or block diagram form in order not to obscure the present invention in unnecessary detail, and details concerning various other components known to the art, such as magnets, coils, Halbach cylinders, and the like necessary for the operation of many electrical devices, have not been shown or discussed in detail inasmuch as such details are not considered necessary to obtain a complete understanding of the present invention, and are considered to be within the skills of persons of ordinary skill in the relevant art. Additionally, as used herein, the term "substantially" is to be construed as a term of approximation.

Referring to FIG. 1 of the drawings, the reference numeral 100 designates a Halbach electric motor embodying features of the present invention. The motor 100 includes a stator assembly 102, a primary rotor 104, and a secondary rotor 106 rotatably mounted within the stator assembly 102. While the motor 100 may also function as an electric generator, discussed further below, it will generally be referred to herein as a motor.

The stator assembly 102 includes a scaffolding structure 108 and a plurality of wire coils 110 wound around the scaffolding structure 108 and partially encased (shown) or fully encased (not shown) in an encasement 112. The encasement 112 and scaffolding structure 108 are fabricated from a magnetically permeable material, such as nylon, HDPE (i.e., high-density polyethylene), or the like. A low-friction material, such as PTFE (i.e., Teflon®) or the like, is preferably applied to the interior surface of the scaffolding structure 108. It can be appreciated that with the application of current through the coils 110, the coils form electromagnets, and so are also referred to herein as electromagnets 110. The coils 110 preferably alternate between coils 110a and 110b which are configured electrically (e.g., serially or in parallel, and direction of current flow) and physically (e.g., direction of windings) so that the magnetic polarity of each coil 110a alternates with (i.e., opposes) each adjacent coil 110b. While four coils 110a and four coils 110b are exemplified in FIG. 1 (only two of each of which are shown, each extending across a sector of about 45° of the motor 100), the motor 100 may be configured using any number of coils 110a and 110b, so long as the number of coils 110a and 110b are equal and alternately juxtaposed against each other. A controller 113 is coupled to a power source 114 and to the coils 110 for controlling the flow of electrical current to the coils 110. It may be appreciated that, because each coil 110a and 110b is preferably wound in a direction opposite that of the coil adjacent to it, the coils 110a and 110b produce opposing magnetic fields between adjacent coils 110a and 110b when electrical current is applied to them via the controller 113.

The primary rotor 104 includes a primary rotor encasement 116 slidably mounted within the scaffolding 108. The primary rotor encasement 116 is fabricated from a magnetically permeable material, such as nylon, HDPE, or the like, and a low-friction material, such as Teflon® or the like, is applied to the outer surface thereof. The primary rotor encasement 116 encases a plurality of permanent primary rotor magnets 118 comprising magnets 118a, 118b, 118c, and 118d (FIGS. 2 and 3) positioned within the primary rotor encasement 116 so that the magnetic orientation of each magnet 118a, 118b, 118c, and 118d is axially rotated 90° from each respective adjacent magnet 118a, 118b, 118c, and 118d, as depicted by respective circumferential counter-clockwise north-pointing arrows 118a', radial outward north-pointing arrows 118b', circumferential clockwise north-pointing arrows 118c', and radial inward north pointing arrows 118d', so as to form a Halbach cylinder of primary rotor magnets 118, shown more clearly in FIG. 3, discussed below. It is understood that the coils and magnets discussed herein may vary in size, shape, and proportion from that shown in the figures.

In a preferred embodiment of the invention, the primary rotor 104 is carefully balanced to minimize normal forces (i.e., forces perpendicular to the surface) between the interior surface of the scaffolding structure 108 of the stator 102 and the exterior surface of the primary rotor encasement 116 when the primary rotor 104 is rotating within the stator 102.

The secondary rotor 106 includes an axle 120 on which the secondary rotor 106 is rotably mounted for rotating relative to the stator assembly 102. A hub 122 extends radially outwardly from the axle 120 to a secondary rotor encasement 126. The secondary rotor encasement 126 is fabricated from a magnetically permeable material, such as nylon, HDPE, or the like. The secondary rotor encasement 126 encases a plurality of permanent secondary rotor magnets 128 positioned within the encasement 126. The magnets 128 comprise magnets 128a, 128b, 128c, and 128d oriented so that their magnetic orientation is axially rotated 90° from each respective adjacent magnet 128a, 128b, 128c, and 128d, as depicted by circumferential clockwise north-pointing arrows 128a', radial outward north-pointing arrows 128b', circumferential counter-clockwise north-pointing arrows 128c', and radial inward north-pointing arrows 128d', so as to form a Halbach cylinder of magnets 128 configured to direct magnetic flux substantially radially outwardly, coaxially nested within the Halbach cylinder of magnets 118, configured to direct magnetic flux substantially radially inwardly. It may be appreciated that while circumferential magnets 118a, 118c, 128a, and 128c are shown as longer than radial magnets 118b, 118d, 128b, and 128d in FIGS. 1 and 2, the size of each magnet may vary depending on design considerations.

In a preferred embodiment, the surface of the scaffolding structure 108 of the stator 102 interfaces with the surface of the primary rotor 104 encasement 116 to define a plane bearing between the respective surfaces. Careful balancing of the primary rotor 104 minimizes normal forces (i.e., forces perpendicular to the surfaces). Lubricity may be achieved with fluid lubrication, or without lubrication by employing magnetically permeable materials, such as nylon, HDPE, PTFE, and the like characterized by low coefficients of friction. Components of both the primary rotor 104 and the secondary rotor 106 may be sealed within a PTFE housing. Likewise, the stator coils 110 may be placed within a toroidal PTFE housing, sealed from the environment and resistant to extreme temperatures and pressures.

Normal forces at the plane bearing surface of each rotor 104 and 106 is implicitly minimized by design. The circumferential arrangement of both the rotors as well as the stator coils will bias the rotors to remain coaxial with the stator coils, because the magnetic fields of the circumferential permanent magnets within each rotor will tend to align with the magnetic field produced by each stator coil in the same manner that a compass aligns with magnetic north. The truest alignment between the magnetic fields produced by each circular rotor and the circular stator coils occurs when stator and rotor are coaxial. Should a rotor drift away from being coaxial, the magnetic field of the stator coil would exert a torque on the individual circumferential magnets within the respective rotor. This torque increases the more the rotor drifts away from being coaxial, and decreases as the rotor and stator align and become coaxial. The net effect is to nudge the rotor towards the lowest energy state wherein rotor and stator are coaxial.

At least one suitable sensor is preferably coupled to the motor 100 for sensing the angular position of the motor. As exemplified in FIGS. 1 and 2, two relatively small coil sensors 141 are preferably positioned between two coils 110 for sensing when radial magnets 118b and 128b, or when radial magnets 118d and 128d, are aligned with the coil 141. The coil sensors 141 are coupled to the controller 113 via wires 142. The coil sensors 141 are preferably operative to inductively sense movement and position of the radial magnets 118b and 128b, or the radial magnets 118d and 128d, and to generate a signal to the controller 113 for reversing the flow of electrical current through the coils 110, as discussed in further detail below. Other suitable sensors 141 (not shown) include Hall effect sensors, laser sensors, and the like.

The motor 100 preferably also includes one or more (up to the number of coils 110) permanent positioning startup magnets 140 (exemplified in FIGS. 1 and 2 as two magnets) positioned within the stator assembly 102. The one or more positioning startup magnets 140 are preferably positioned proximate to the middle of one or more coils 110 and are radially polarized so that when the motor comes to a stop with no load on the motor and no current applied to the coils 110, the radial magnets 118b and 128b will preferably be aligned with and magnetically coupled to the positioning startup magnets 140, and thereby bias the direction of movement of the motor to start in a predetermined direction controllable by the controller 113, discussed below.

Figure 2:
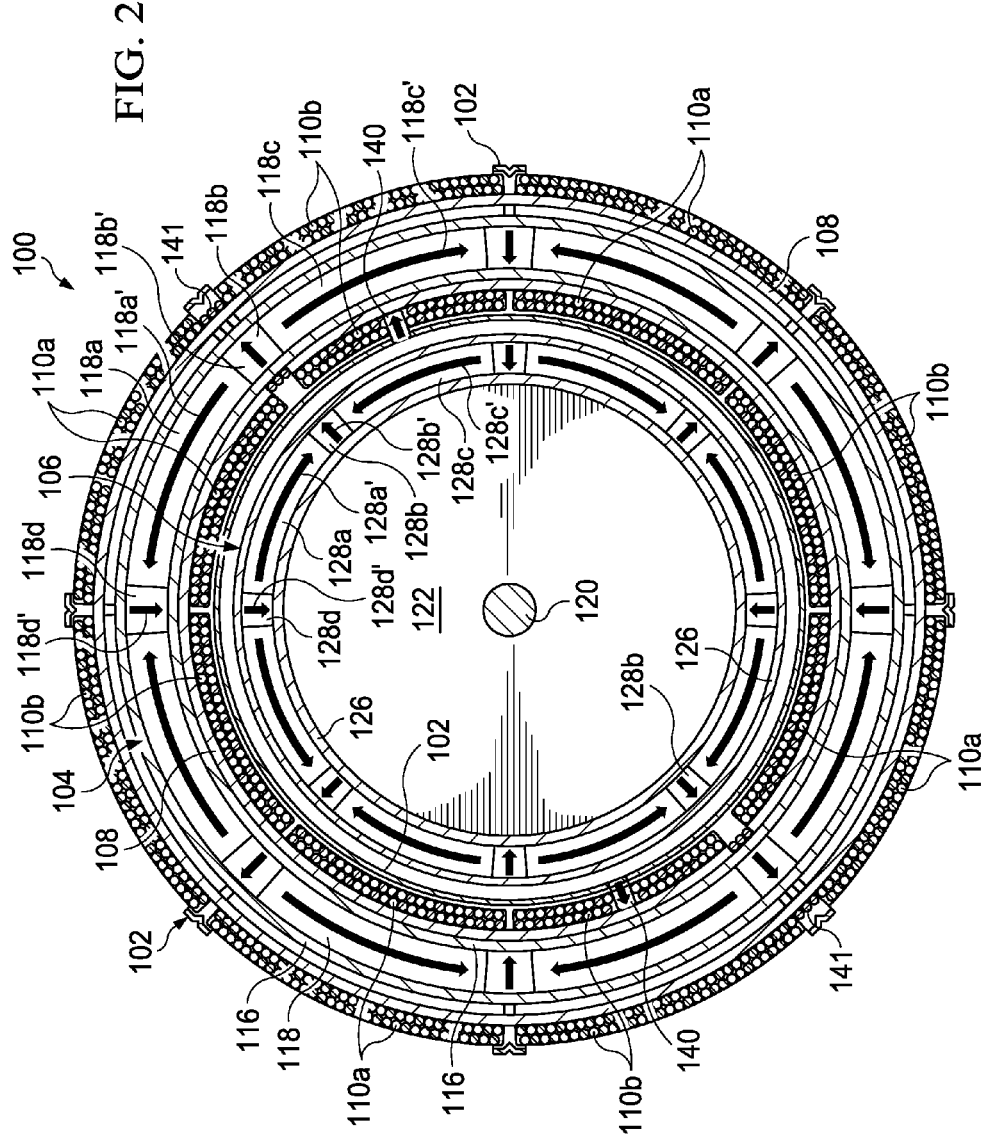
FIG. 2 is a cross-sectional view of the motor and generator of FIG. 1 taken along the line 2-2 of FIG. 1.

FIG. 2 is a cross-sectional view of the motor 100 taken along the line 2-2 of FIG. 1. While not shown as such, in a stationary position, the secondary rotor encasement 126 is preferably oriented so that the positioning startup magnets 140 are magnetically aligned with radial secondary rotor magnets 118b and 128b.

Figure 3:
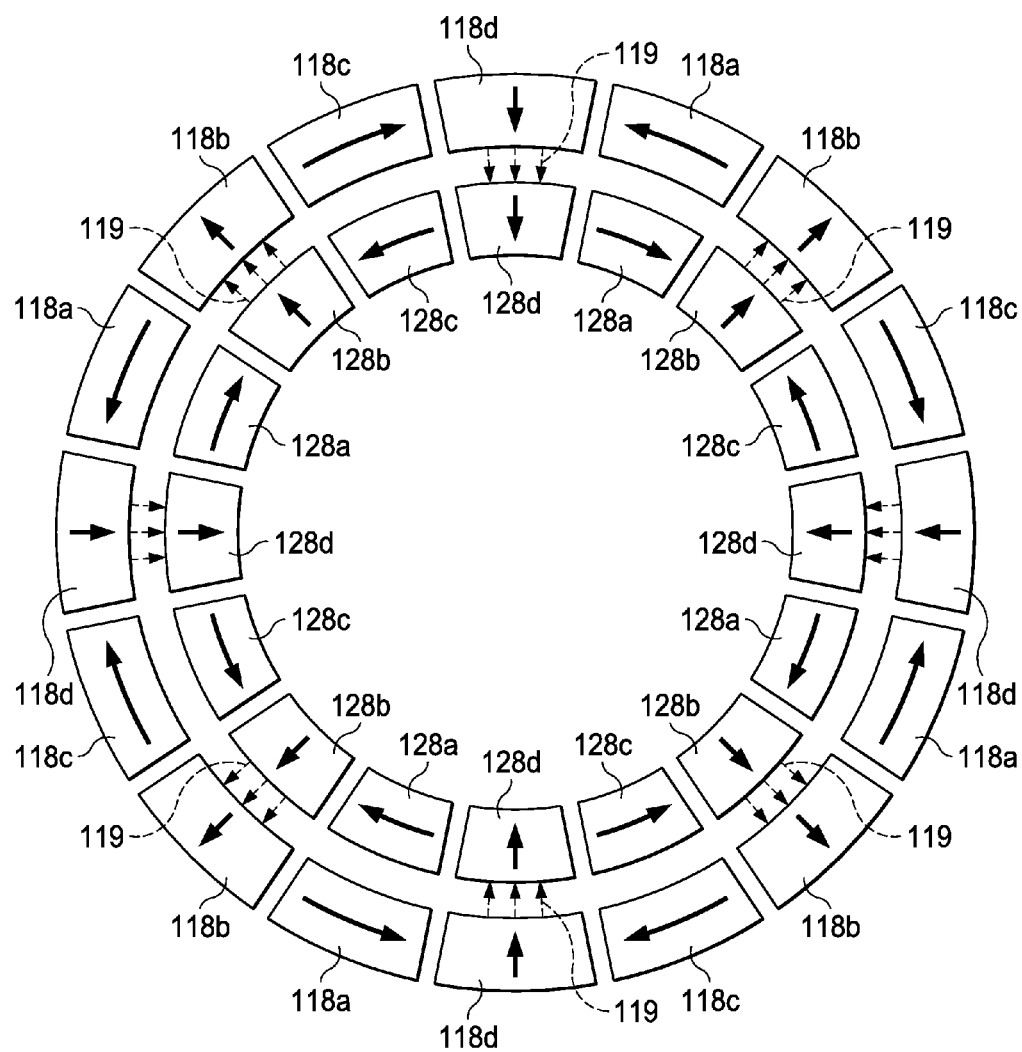
FIG. 3 is a schematic drawing showing the magnetic circuits coupling two coaxially nested Halbach cylinders implemented by the motor and generator of FIG. 1.

FIG. 3 is a schematic diagram depicting the ring-shaped arrays of magnets 118 and 128, also referred to herein as "cylinders", resized to more clearly illustrate the magnetic circuits formed as coaxially nested Halbach cylinders comprising (1) an outer Halbach cylinder comprising the magnets 118, and (2) an inner Halbach cylinder comprising the magnets 128. If the magnetic orientation of the radial magnets 128b, as indicated by the arrows 128b', is not aligned with the arrows 118b' of the magnets 118b as shown in FIG. 3, the magnets 128 will tend to rotate the secondary rotor 106 until the magnetic orientation of the magnets 118 and 128 are aligned, as shown in FIG. 3. In accordance with principles of Halbach cylinders, when the magnets 118 and 128 are aligned as shown in FIG. 3, magnetic flux 119 is created between magnets having magnetic orientations 118b and 128b, and between magnets having magnetic orientations 118d and 128d. The coaxially-nested Halbach cylinders produce a series of repeating magnetic circuits which alternate between clockwise (e.g., through magnets 118b, 118c, 118d, 128d, 128c, and 128b) and counterclockwise (e.g., through magnets 118b, 118a, 118d, 128d, 128a, and 128b). It may be appreciated that the number of magnetic circuits corresponds to the number of coils 110 (eight circuits are displayed in FIG. 3, though the number of circuits may vary). With the magnets 118 and 128 oriented as shown in FIG. 3, magnetic reluctance is minimized and the inner and outer Halbach cylinders 118 and 128 may be said to be "magnetically coupled" together through the magnetic fluxes 119, so that when one Halbach cylinder 118 or 128 rotates, torque is effectively transferred from that cylinder to the other cylinder 128 or 118, with the result that both cylinders 118 and 128 rotate synchronously together as a phenomenon of coaxially nested Halbach cylinders.

Further examination of the nature of coaxially nested Halbach cylinders will shed light on the form and function of the present embodiment. A Halbach array is typically presented as comprising five contiguous magnets, each rotated 90 degrees with respect to its immediately adjacent neighbor. By extension, a Halbach series is any arrangement of contiguous magnets that continues this pattern, wherein additional magnets are 90 degrees rotated with respect to each adjacent neighbor. In both the Halbach array and the Halbach series, magnetic flux emanates predominantly from one side of the series while the other side is said to be magnetically shielded. A variation of the Halbach series is the Halbach cylinder, which is a Halbach series configured as a continuous cylindrical loop. A Halbach cylinder may be configured to direct magnetic flux either inward, towards the axis of the cylinder, or outward, away from the axis of the cylinder A pair of coaxially nested Halbach cylinders has been described as two Halbach cylinders magnetically coupled such that the magnetic flux of one cylinder is directed towards the other, and vice versa.

Consider first the coaxially nested Halbach rings 118 and 128 depicted in FIG. 3. The rings in FIG. 3 are arranged in a circular Halbach series such that the magnetic flux of the outer ring is directed towards the inner ring and vice versa. The smallest unit of a Halbach series is a Halbach Array, and an example from FIG. 3 would be the five adjacent magnets 118a, 118b, 118c, 118d, and finally a second 118a. In order to facilitate a better understanding of the form and function of the present invention, however, a more fundamental unit will be described and called a "reluctance array". An example from FIG. 3 would be the three adjacent magnets 118b, 118c, and 118d. Opposite this reluctance array is a second reluctance array labeled 128b, 128c, and 128d. When magnetically coupled, these two complimentary reluctance arrays complete an inherently powerful magnetic circuit 118b-118c-118d-128d-128c-128b, held together by magnetic reluctance. Thus, the reluctance arrays are so named because rotating one array relative to the other disrupts the powerful magnetic circuit, and has the effect of increasing magnetic reluctance. As regards the form of the present invention, note that in a preferred embodiment the number of stator coils has a 1:1 correspondence with the number of complimentary reluctance arrays.

In operation as a motor, the power source 114 preferably supplies electric current to the controller 113. The controller 113 preferably regulates and modulates as necessary the electric current, and then feeds the electric current to the coils 110 via the lines 143. As discussed above, the coils are configured so that upon receipt of the current, the coils behave as electromagnets and generate magnetic fields, such that adjacent coils 110a and 110b, have opposing magnetic polarities. The magnets 118a and 118c contained within the rotor 104 are then induced by the magnetic fields to move and rotate the primary rotor 104, the direction of which is discussed below. The magnetic flux 119 between magnets 118b and 128b and between 118c and 128c then induces corresponding rotation in the secondary rotor 106. Rotation of the secondary rotor 106 may be used to provide rotational drive for any mechanical equipment (e.g., machinery, automobiles, propellers, and/or the like) requiring rotational drive for its operation.

As the primary rotor 104 is rotating, the sensor 141 detects when the magnets 118b or 118d pass by, and generates a signal via the lines 142 back to the controller 113 of such detection. Upon receipt of such signal, the controller 113 reverses the phase of the electric current by 180° with the result that the magnetic field generated by each coil 110 is reversed and the magnets 118a and 118b are magnetically induced to continue moving, and hence to continue rotating the primary rotor 104 and, as discussed above, the secondary rotor 106. The angular velocity of the primary rotor may be accelerated by advancing the timing of the phase reversal of the electric current, and at the same time increasing the current. Similarly, the angular velocity of the primary rotor may be decelerated by retarding the timing of the phase reversal of the electric current, and at the same time decreasing the current. In a preferred embodiment of the invention, a variable frequency drive (VFD) is used in conjunction with the sensor 141 to control the phase reversals of the controller 113, as well as any change in speed of the primary rotor 104.

When the motor 100 is brought to a stop, the rotors 104 and 106 will tend to assume a stationary position wherein the magnets 118b and 128b are lined with the one or more positioning startup magnets 140. This insures that when the motor 100 is restarted, it will always restart and rotate in the same direction.

Figure 4A:
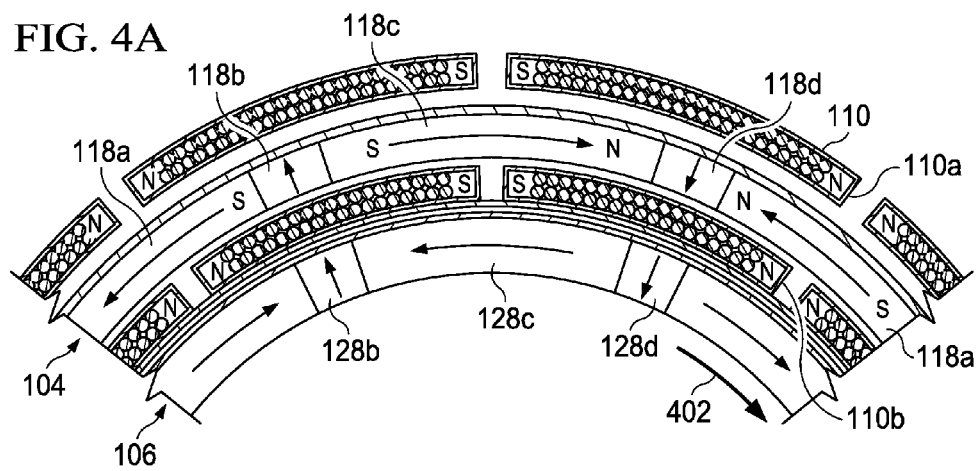
FIGS. 4A, 4B, and 4C exemplify operation of the motor and generator of FIGS. 1-3 through a clockwise rotation.
Figure 4B:
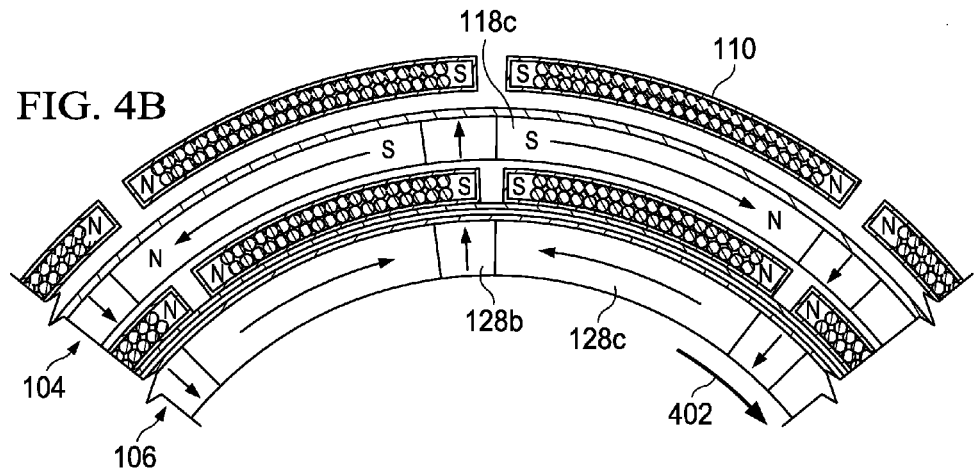
Figure 4C:
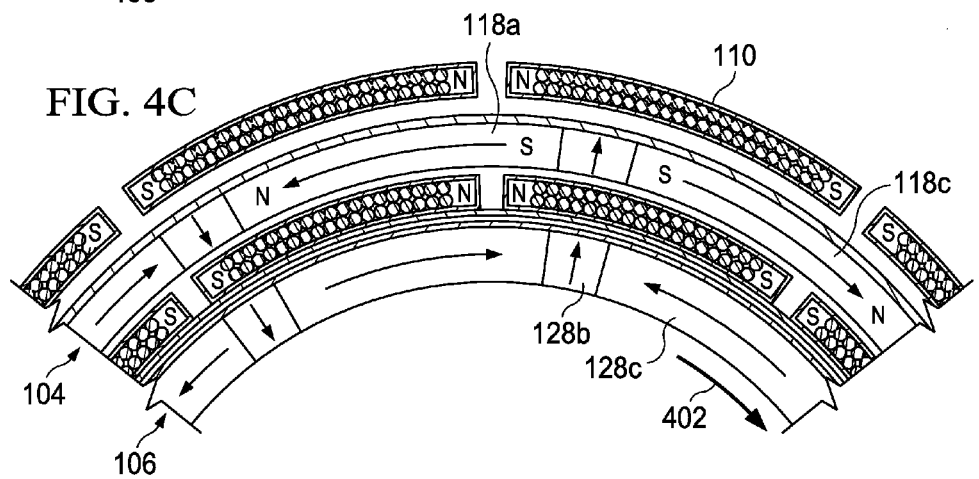

By way of example, but not limitation, see FIGS. 4A-4C. If the stationary position of the primary rotor 104 is as shown in FIG. 4A, and electric current is applied to induce the North/South (N/S) polarities of the electromagnets 110 shown in FIG. 4A, then the motor will start and rotate in a clockwise direction, as indicated by the arrow 402. Once the motor 100 has started turning, the polarity of the electromagnets is reversed every time the sensor coil 141 senses that a radial primary rotor magnet 118b or 118d has come into alignment with it. FIG. 4B depicts the position of the primary rotor 104 as a radial magnet 118b or 118c is passing by the coil 141 (not shown). FIG. 4C then shows the reversal of the magnetic polarities of the coils 110 and the continuing rotation of the primary rotor 104.

Figure 4D:
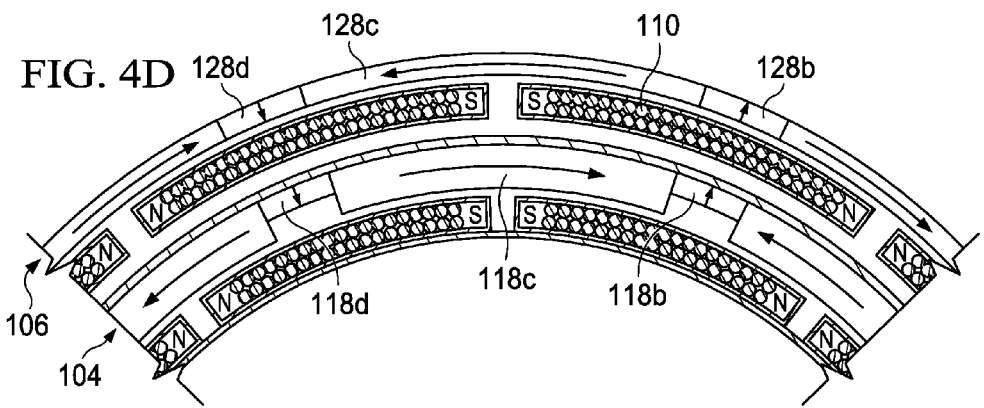
FIGS. 4D, 4E, and 4F exemplify operation of the motor and generator of FIGS. 4A, 4B, and 4C through a clockwise rotation, wherein the secondary rotor is positioned outside the stator coils.
Figure 4E:
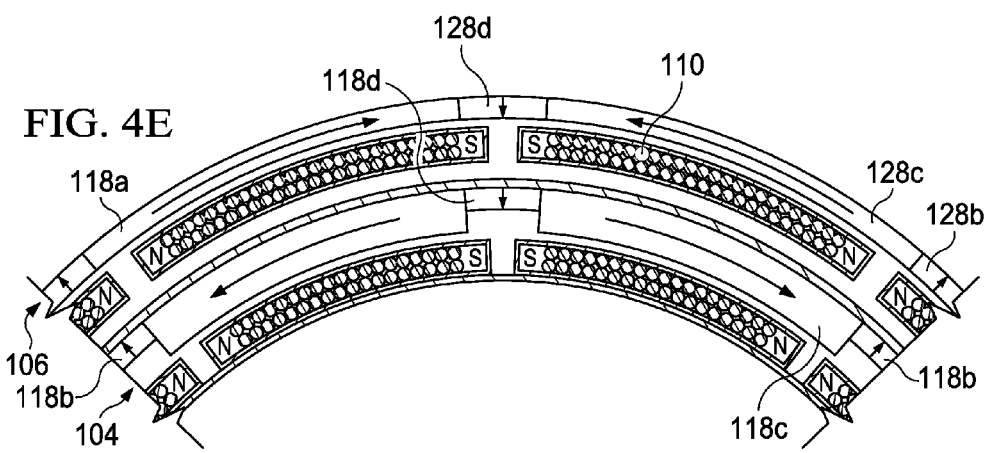
Figure 4F:
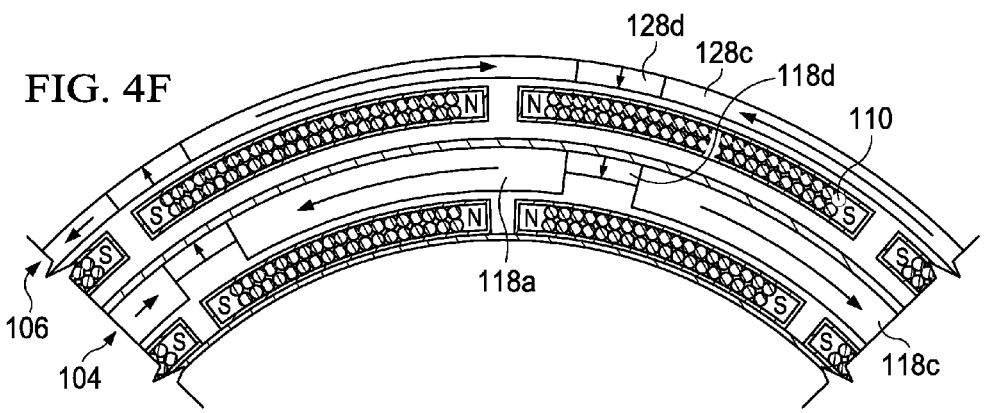

FIGS. 4D, 4E, and 4F exemplify an alternative embodiment, wherein the secondary rotor 106, comprising secondary rotor magnets 128, is provided with a radius that is larger than the radius of the primary rotor 104.

It may be appreciated that if the torque generated by the motor 100 exceeds the torque capacity (reluctance capacity) of the coaxially nested Halbach cylinders, that is, if the load on the motor 100 exceeds the torque capacity of the motor, then magnetic and mechanical slippage will occur between the primary rotor 104 and the secondary rotor 106, resulting in power loss. In such situations, it is preferable to slow the motor rather than allow slippage. The motor may be slowed when using a commuterless single-phase variable frequency drive (VFD) by reducing the frequency of the current to the motor, and hence reducing the speed of the motor. Where DC current is used, potential for slippage may be negated by commutation with the sensor 141, such as a Hall effect sensor, magnetically tethered to the rotation of the secondary rotor 106, or of a component attached to the rotor, so that if the secondary rotor 106 begins to slip relative to the primary rotor 104, then the commutation signal would commensurately slip, thus slowing the primary (coil) rotor 104, and hence motor 100, to match the speed of, and load on, the secondary rotor 106.

The motor 100 may alternatively be operated as a generator by reversing the foregoing process. More specifically, mechanical torque may be applied to rotate the secondary rotor 106. As a consequence of Halbach cylinders discussed above, particularly the magnetic flux 119 (FIG. 3), the primary rotor 104 will rotate synchronously with the secondary rotor 106. Rotation of the coaxially nested Halbach cylinder rotors 118 and 128 through the coils 110 will generate electric current in the coils 110, which may be tapped via the lines 143. It may be appreciated that the controller 113, power source 114, sensor 141, and positioning startup magnets 140 are not required in the operation of the motor 100 as a generator.

Figure 5:
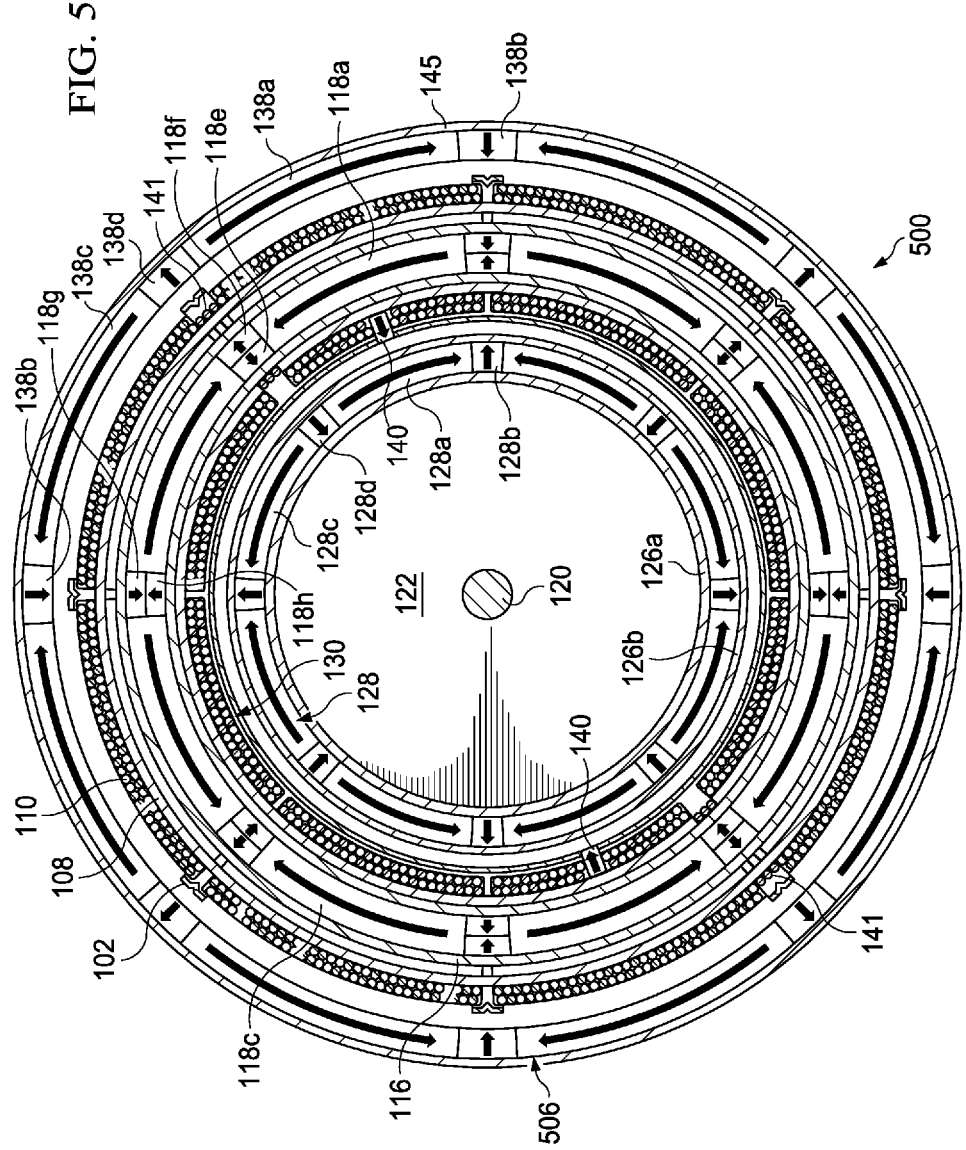
FIG. 5 exemplifies a first alternative embodiment of the invention, wherein the motor and generator of FIGS. 1-4 is supplemented with a tertiary rotor in accordance with principles of the present invention.

FIG. 5 exemplifies an alternative embodiment 500 of the motor 100. The motor 500 is similar to the motor 100, but in addition, includes a tertiary rotor 506 rotatably and coaxially mounted about the outer surface of the coils 110. The tertiary rotor 506 includes magnets 138, similar to the magnets 118. Accordingly, the magnets 138 include circumferential magnets 138a and 138c having circumferential magnetic orientations, and radial magnets 138b and 138d having radial magnetic orientations. To facilitate magnetic circuits between the primary rotor magnets 118 and the secondary and tertiary rotor magnets 128 and 138, each of the radial magnets 118b are split circumferentially to form two magnets 118e and 118f, oriented in opposite magnetic polarities, and each of the radial magnets 118*d* are split circumferentially to form two magnets 118*g* and 118*h*, also oriented in opposite magnetic polarities. In operation, the magnets 128*b* are aligned with the magnets 118*h*, the magnets 128*d* are aligned with the magnets 118*e*, the magnets 138*b* are aligned with the magnets 118*g*, and the magnets 138*d* are aligned with the magnets 118*f*. As shown in FIGS. 6A, 6B, and 6C, operation of the motor 500 is similar to operation of the motor 100 as described above with respect to FIGS. 4A, 4B, and 4C, but for the tertiary rotor 506 which rotates synchronously with the secondary rotor 106. It may be appreciated that the secondary rotor 106 and tertiary rotor 506 may be coupled together or physically attached to each other to provide a more efficient drive than the motor 100 by capturing more energy available from magnetic flux emanating from the coils 106. Alternatively, the secondary rotor 106 and tertiary rotor 506 may be used independently of one another to drive separate devices, equipment, or the like.

Figure 7A:
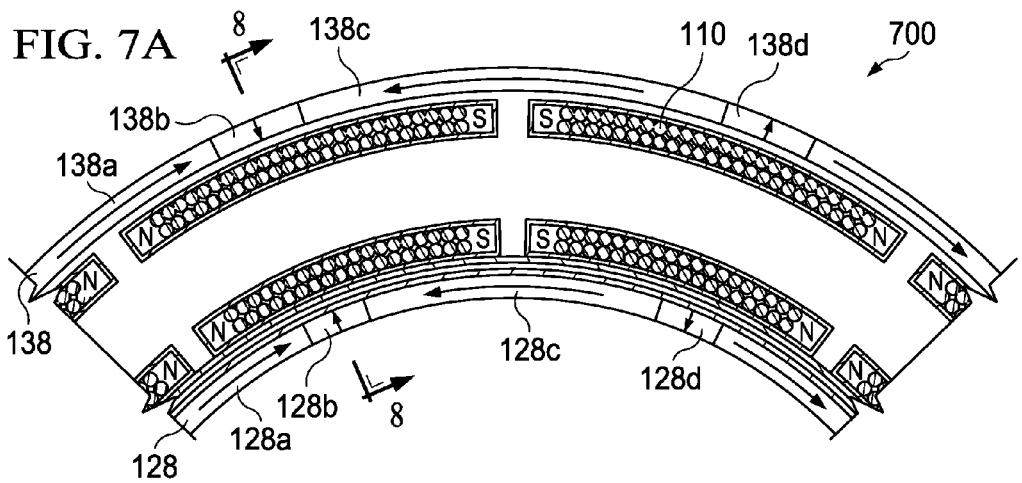
FIGS. 7A, 7B, and 7C exemplify a second alternative embodiment, and the operation thereof, of the invention, in which the primary Halbach cylinder rotor of the motor and generator of FIGS. 5-6C is removed in accordance with principles of the present invention.
Figure 7B:
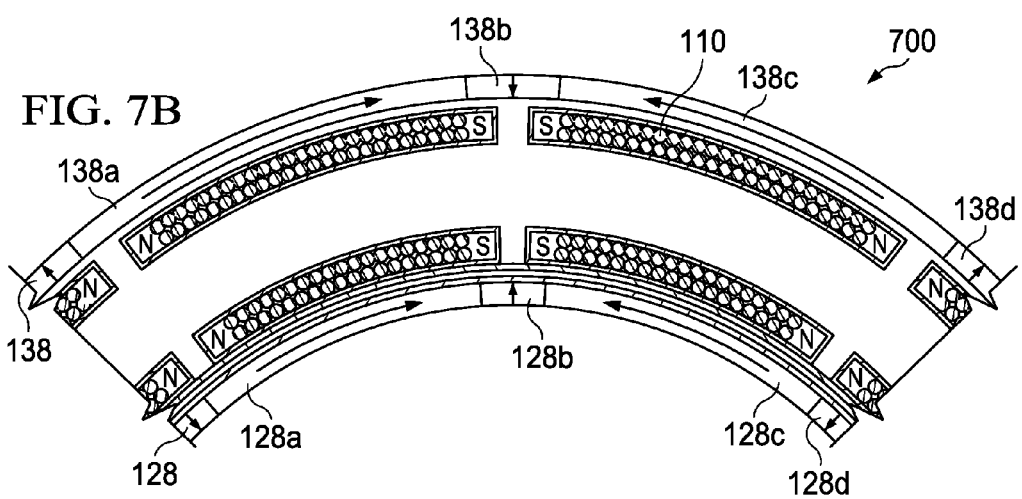
Figure 7C:
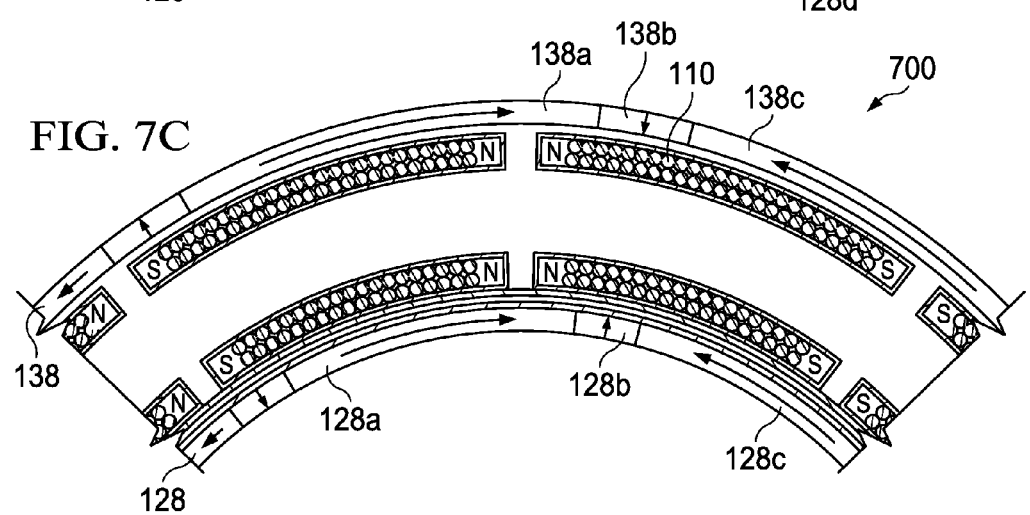
Figure 8:
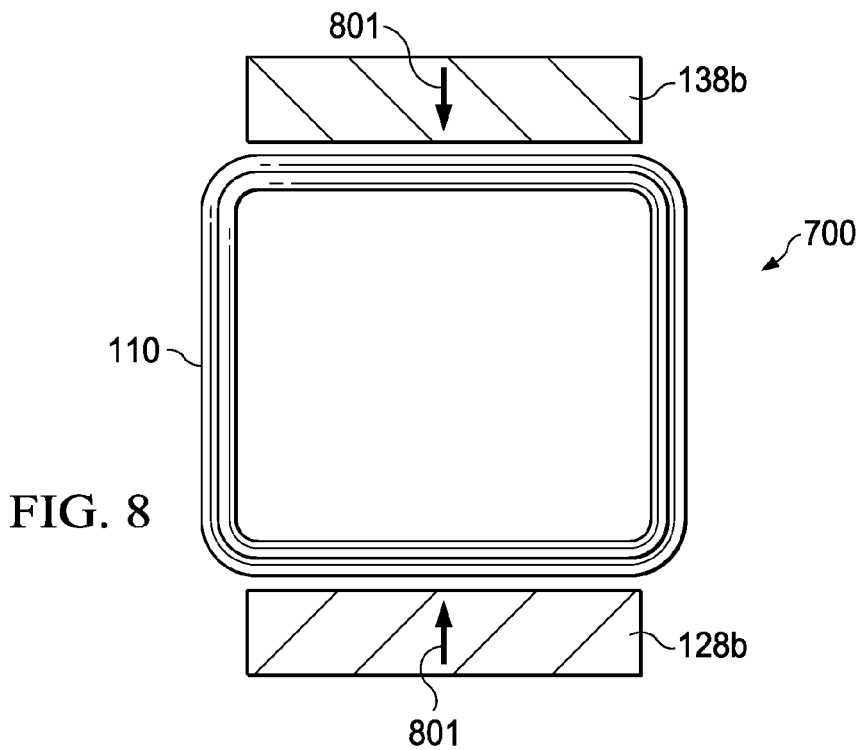
FIG. 8 depicts a cross-sectional view of the motor and generator of FIG. 7A taken along the line 8-8 of FIG. 7A.
Figure 9:
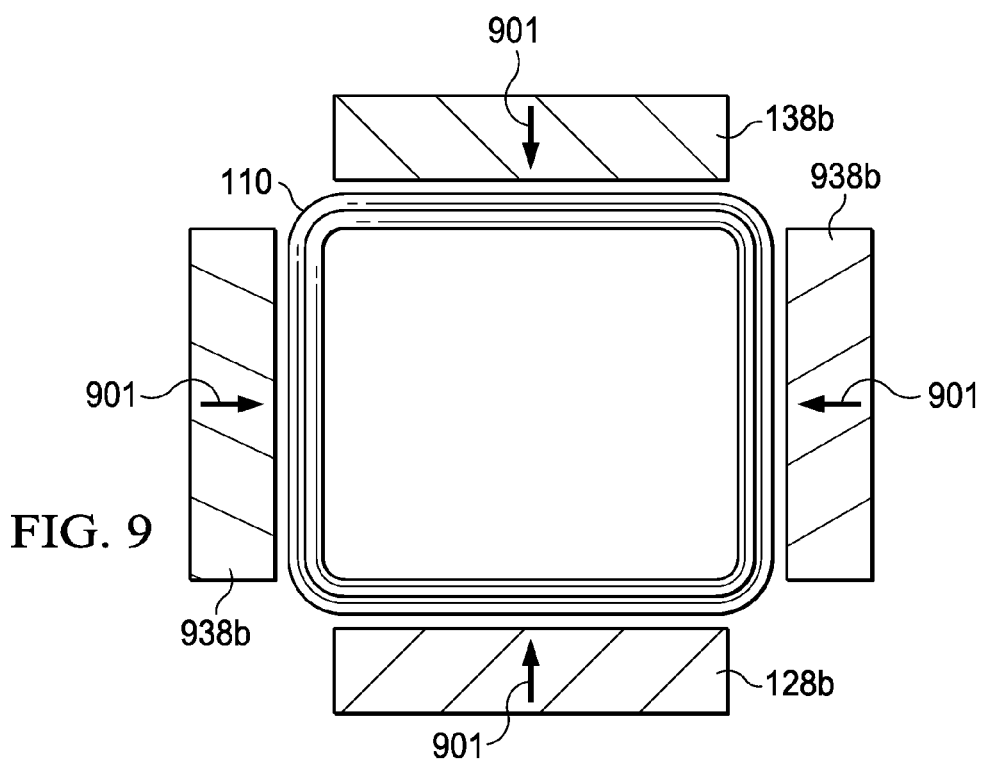
FIG. 9 exemplifies a cross-sectional view of an alternative embodiment of the motor and generator of FIGS. 7A-8 in which rotor magnets are positioned on four sides of the coils.

FIGS. 7A, 7B, and 7C exemplify a further alternative embodiment 700 of the motor 500. The motor 700 is similar to the motor 500, but for the primary rotor 104 which is not included in the motor 700. FIG. 8 shows a cross-section of the motor 700 taken along the line 8-8 of FIG. 7A. As shown, the coils 110 are substantially square (or, alternatively, rectangular), and a magnet 128*b* is positioned under the coils, and a magnet 138*b* is positioned above the coils. The radial magnets, exemplified by the magnets 128*b* and 138*b*, have the same magnetic orientation with respect to the coils 110, depicted by the arrows 801. As shown in FIGS. 7A, 7B, and 7C, operation of the motor 700 is similar to operation of the motor 500, but for the secondary rotor 106 and tertiary rotor 506 being driven from magnetic forces generated by the coils 110. An advantage of the motor 700 over the motors 100 and 500 is that there is no slippage between the primary rotor 104 on the one hand, and secondary rotor 106 and tertiary rotor 506 on the other hand. FIG. 9 exemplifies a cross-section of an enhanced embodiment of the motor 700, wherein the magnets 128*b* and 138*b* are complemented with magnets 938*b* positioned on each side of the coils 110 to further capture energy available from magnetic flux emanating from the coils 106. Operation of the motor 700 is similar to the operation of the motor 700 discussed above with respect to FIGS. 7A-8. It is understood that the magnets 938*b* are mounted on one or two rotors. The rotors to which the magnets 128*b*, 138*b*, and 938*b* are mounted may each drive separate mechanical equipment, or the rotors may be coupled together or physically connected in any combination to drive one or more pieces of mechanical equipment.

Figure 12:
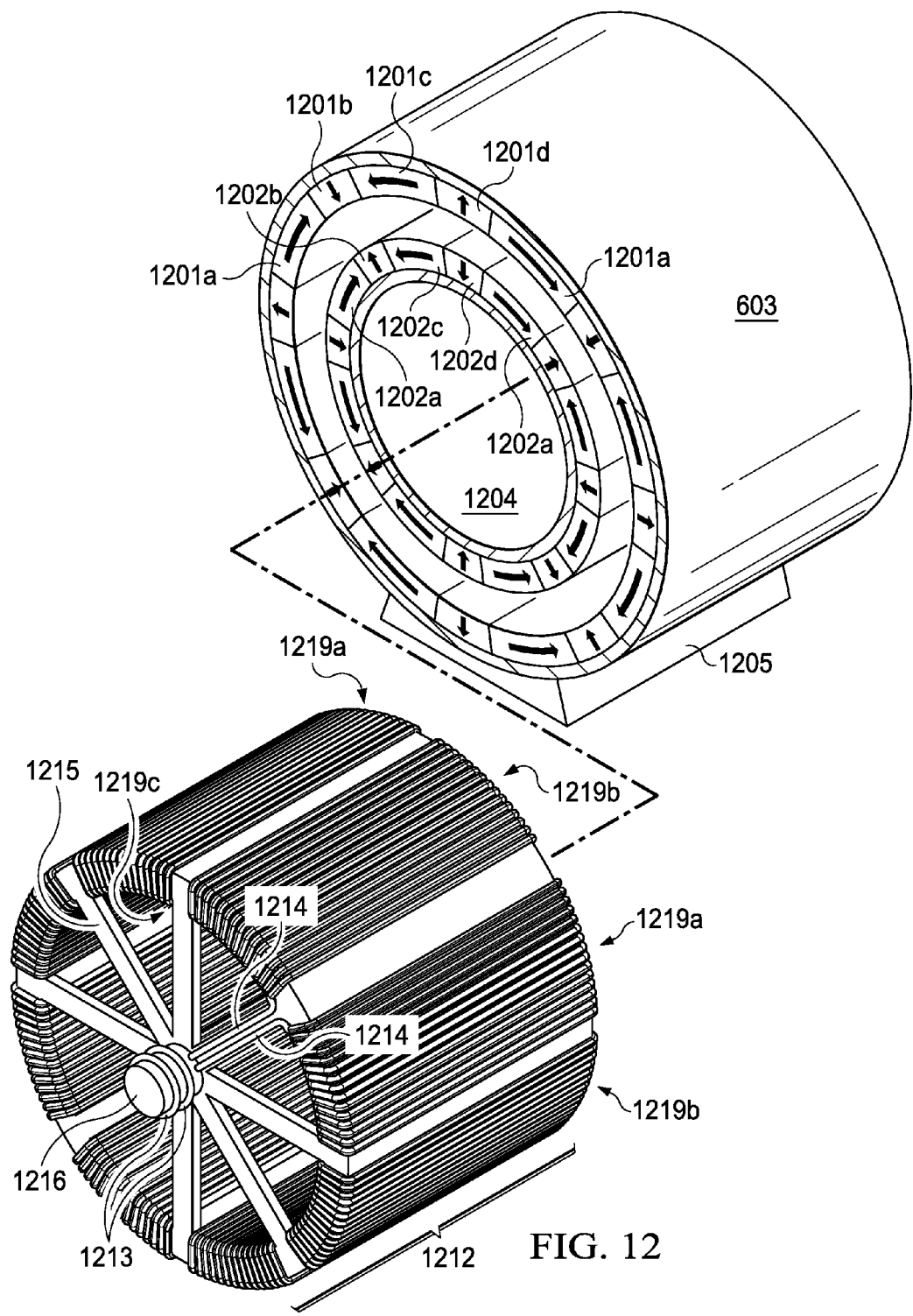
FIG. 12 is a perspective view exemplifying a further alternate embodiment of a motor and generator embodying features of the present invention.

FIG. 12 exemplifies a further alternative embodiment 1203 of the invention wherein a cylindrical coil assembly 1212 preferably rotates in a sandwiched position between two stationary external and internal Halbach cylinders 1201 and 1202. The external cylinder 1201 includes magnets 1201*a*, 1201*b*, 1201*c*, and 1201*d* configured to substantially confine a magnetic field within the cylinder. The internal cylinder 1202 includes magnets 1202*a*, 1202*b*, 1202*c*, and 1202*d* configured to substantially form a magnetic field externally of the cylinder. Thus, the cylinders 1201 and 1202 each have magnetic fields directed toward the other. The coil assembly 1212 rotates on an axle 1216 and includes spokes 1215 which support a structure of coils 1219*a* and 1219*b* which alternate positionally and are preferably wound in opposing directions. The coils 1219*a* and 1219*b* are electrically coupled via lead lines 1214 to a commutator 1213 for communicating electric current between the coils and an external electrical apparatus, such as a battery or load of some sort.

In the operation, the device 1203 may be used as a motor by supplying an electric current through the commutator 1213 and lead wires 1214 to the coils 1219*a* and 1219*b*. The coils 1219*a* and 1219*b* then generate electromagnetic fields which interact with the magnetic fields of the cylinders 1201 and 1202 to rotate the coil assembly, which rotation may be harnessed to drive rotating mechanical equipment. Alternatively, the device 1203 may be used as a generator by rotating the coil assembly 1212 between the cylinders 1201 and 1202 so that the magnetic fields formed by the cylinders generates induce an electric current in the coils 1219*a* and 1219*b*, which then flows through the lead lines 1214 and commutator 1213 to an electric load (not shown) coupled to the commutator.

It is understood that the present invention may take many forms and embodiments. Accordingly, several variations may be made in the foregoing without departing from the spirit or the scope of the invention. For example, the motors 100, 500, and 700 may be used as generators by removing the controller 113 and power supply 114, and providing a driving force to the secondary and/or tertiary rotors which would then induce an electric current in the coils 110 which would then flow through the wires 142.

Figure 10:
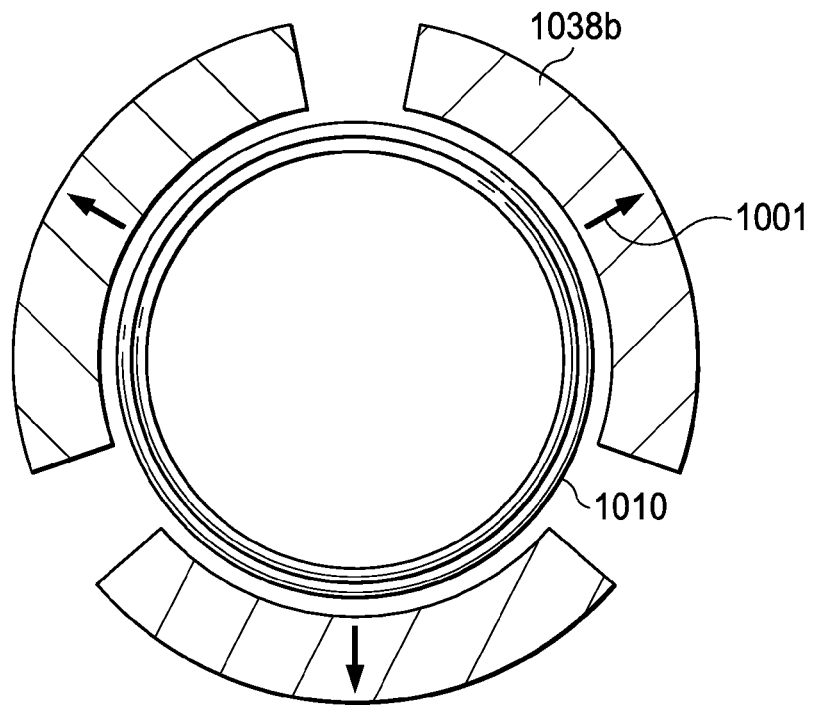
FIG. 10 exemplifies a cross-sectional view of an alternative embodiment of the motor and generator of the present invention, wherein the coils define a circular cross-section and three rotor magnets are positioned around the coils.
Figure 11:
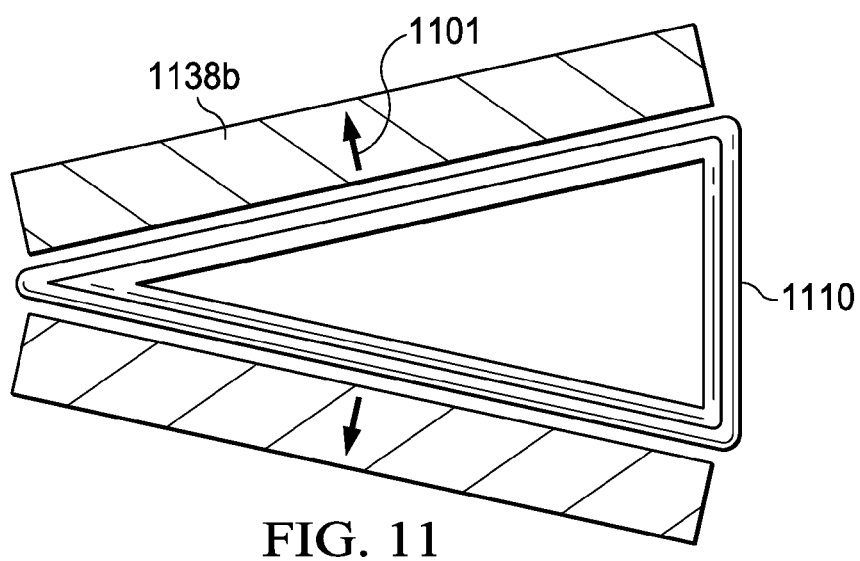
FIG. 11 exemplifies a cross-sectional view of an alternative embodiment of the motor and generator of the present invention, wherein the coils define a triangular cross-section; and one rotor magnet is positioned adjacent two sides of the coils.

In further variations, and with reference to FIGS. 10 and 11, the cross-sectional shape of the coils may assume any of a number of different configurations. By way of example, but not limitation, FIG. 10 exemplifies circular (or, alternatively, oval or elliptical) coils 1010 enveloped by magnets 1038*b* conforming to the shape of the coils 1010 and having magnetic orientations 1001. In a further example, FIG. 11 illustrates triangular coils 1110 with magnets 1138*b* on two sides of the coils 1110 and having magnetic orientations 1101. It may thus be appreciated that the coils and magnets of the invention may be configured in any number of different ways.

In a still further embodiment of the invention, the magnets 118, 128, and optionally 138, may remain stationary, while the coils 110 may rotate.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A device comprising:
   a plurality of electric coils arranged in the shape of a toroid and configured so that, upon the application of electric current through the plurality of coils, adjacent coils generate magnetic fields of opposing polarities;
   a primary rotor having a plurality of permanent primary magnets positioned within the plurality of electric coils for passing through the plurality of electric coils and configured as a primary Halbach cylinder having a primary magnetic field;
   a secondary rotor mounted coaxially with the primary rotor externally of the plurality of coils and for rotation relative to the plurality of electric coils, the secondary rotor including a plurality of permanent secondary magnets configured as a secondary Halbach cylinder having a secondary magnetic field directed toward the primary rotor and configured to magnetically couple with the primary Halbach cylinder, and wherein the plurality of permanent primary magnets are configured as a primary Halbach cylinder having a primary magnetic field directed toward the secondary rotor and are configured to magnetically couple with the secondary Halbach cylinder, to thereby effectuate the transfer of torque from the primary rotor to the secondary rotor; and means for conducting electric current between the plurality of electric coils and an electric apparatus.

2. The device of claim 1 wherein the plurality of electric coils are substantially stationary, and the primary rotor and the secondary rotor rotate relative to the plurality of electric coils.

3. The device of claim 1 wherein the primary rotor and the secondary rotor are substantially stationary, and the plurality of electric coils rotate relative to the primary rotor and the secondary rotor.

4. The device of claim 1 wherein the primary rotor includes paired magnets having radial magnetic orientation of opposing polarities, and the motor further comprises a tertiary rotor rotatably mounted coaxially with the motor, the tertiary rotor including a plurality of permanent tertiary magnets configured as a Halbach cylinder having a magnetic field substantially confined within the cylinder and configured to magnetically couple with the Halbach cylinder of the primary rotor.

5. The device of claim 1, wherein the means comprises:
a sensor for determining the angular position of at least one of the primary rotor and the secondary rotor; and
a controller configured for receiving electric power and for receiving positional information from the sensor and, based on the positional information, for feeding a controlled quantity of alternating current to the plurality of coils for generating electromagnetic fields for driving the primary rotor for driving the secondary rotor.

6. The device of claim 1, wherein the means comprises:
a sensor for determining the angular position of at least one of the primary rotor and the secondary rotor, the sensor being one of a magnetic sensor, a laser sensor, or a Hall effect sensor; and
a controller configured for receiving electric power and for receiving positional information from the sensor and, based on the positional information, for feeding a controlled quantity of alternating current to the plurality of coils for generating electromagnetic fields for driving the primary rotor for driving the secondary rotor.

7. The device of claim 1, wherein the means comprises:
a sensor for determining the angular position of at least one of the primary rotor and the secondary rotor; and
a controller configured for receiving electric power and for receiving positional information from the sensor and, based on the positional information, for feeding a controlled quantity of alternating current to the plurality of coils for generating electromagnetic fields for driving the primary rotor for driving the secondary rotor, wherein the controller comprises a variable frequency drive (VFD) for controlling the frequency of alternating current fed to the plurality of coils.

8. The device of claim 1 further comprising positioning startup magnets positioned for positioning the secondary rotor, when stationary, in a desired position for influencing the direction of rotation of the secondary rotor at subsequent start-up.

9. The device of claim 1 wherein the plurality of coils are connected in parallel.

10. The device of claim 1 wherein the plurality of coils are serially connected.

11. The device of claim 1 wherein adjacent coils are wound in opposite directions.

12. The device of claim 1 wherein the secondary rotor has a smaller radius than the primary rotor.

13. The device of claim 1 wherein the secondary rotor has a larger radius than the primary rotor.

14. The device of claim 1 wherein the plurality of permanent primary magnets are configured as a primary Halbach cylinder having a primary magnetic field directed substantially toward the secondary magnets, and wherein the plurality of permanent secondary magnets are configured as a secondary Halbach cylinder having a secondary magnetic field directed substantially toward the primary magnets.

15. A generator comprising:
a plurality of electric coils arranged in the shape of a toroid, the coils including lead wires connectable to an electric load;
a primary rotor having a plurality of permanent primary magnets positioned within the plurality of electric coils for passing through the plurality of electric coils and configured as a primary Halbach cylinder having a primary magnetic field; and
a secondary rotor rotatably mounted coaxially with the primary rotor externally of the plurality of coils, the secondary rotor including a plurality of permanent secondary magnets configured as a secondary Halbach cylinder having a secondary magnetic field directed toward the primary rotor and configured to magnetically couple with the primary Halbach cylinder, and wherein the plurality of permanent primary magnets are configured as a primary Halbach cylinder having a primary magnetic field directed toward the secondary rotor and are configured to magnetically couple with the secondary Halbach cylinder, to thereby effectuate the transfer of torque from the primary rotor to the secondary rotor, the second rotor being capable of being coupled to a mechanical rotating drive.

16. The generator of claim 15 wherein the plurality of coils are connected in parallel.

17. The generator of claim 15 wherein the plurality of coils are serially connected.

18. The generator of claim 15 wherein adjacent coils are wound in opposite directions.

19. The generator of claim 15 wherein the secondary rotor has a smaller radius than the primary rotor.

20. The generator of claim 15 wherein the secondary rotor has a larger radius than the primary rotor.

21. The generator of claim 15 wherein the plurality of permanent primary magnets are configured as a primary Halbach cylinder having a primary magnetic field directed substantially toward the secondary rotor, and wherein the plurality of permanent secondary magnets are configured as a secondary Halbach cylinder having a secondary magnetic field directed substantially toward the primary rotor.

22. A method for transferring torque, the method comprising steps of:
passing alternating current ("AC") through a plurality of electric coils arranged end-to-end in the shape of a toroid and configured so that, upon the application of the AC through the plurality of coils, adjacent coils generate electromagnetic fields of opposing polarities;

inducing from the electromagnetic fields movement of a plurality of permanent primary magnets through the plurality of electric coils for rotation relative to the plurality of electric coils, the plurality of permanent primary magnets constituting a primary rotor and configured as a primary Halbach cylinder having a primary magnetic field;

transferring torque from the primary rotor to a secondary rotor magnetically coupled to the primary rotor, wherein the secondary rotor is mounted coaxially with the primary rotor externally of the plurality of coils and for rotation relative to the plurality of electric coils, the secondary rotor including a plurality of permanent secondary magnets configured as a secondary Halbach cylinder having a secondary magnetic field directed toward the primary rotor and configured to magnetically couple with the primary Halbach cylinder, and wherein the plurality of permanent primary magnets are configured as a primary Halbach cylinder having a primary magnetic field directed toward the secondary rotor and are configured to magnetically couple with the secondary Halbach cylinder to thereby effectuate the transfer of torque from the primary rotor to the secondary rotor.

23. The method of claim 22 wherein the primary rotor includes paired magnets having radial magnetic orientation of opposing polarities, and the motor further comprises a tertiary rotor rotatably mounted coaxially with the motor, the tertiary rotor including a plurality of permanent tertiary magnets configured as a Halbach cylinder having a magnetic field substantially confined within the cylinder and configured to magnetically couple with the Halbach cylinder of the primary rotor.

24. The method of claim 22, further comprising:
determining from a sensor the angular position of at least one of the primary rotor and the secondary rotor; and
receiving electric power and receiving positional information from the sensor and, based on the positional information, feeding a controlled quantity of alternating current to the plurality of coils for generating electromagnetic fields for driving the primary rotor for driving the secondary rotor.

25. The method of claim 22, further comprising:
determining from a sensor the angular position of at least one of the primary rotor and the secondary rotor, the sensor being one of a magnetic sensor, a laser sensor, or a Hall effect sensor; and
receiving electric power and receiving positional information from the sensor and, based on the positional information, feeding a controlled quantity of alternating current to the plurality of coils for generating electromagnetic fields for driving the primary rotor for driving the secondary rotor.

26. The method of claim 22, further comprising:
determining from a sensor the angular position of at least one of the primary rotor and the secondary rotor; and
receiving electric power and receiving positional information from the sensor and, based on the positional information, for feeding a controlled quantity of alternating current to the plurality of coils for generating electromagnetic fields for driving the primary rotor for driving the secondary rotor, wherein the controller comprises a variable frequency drive (VFD) for controlling the frequency of alternating current fed to the plurality of coils.

27. The method of claim 22, further comprising positioning startup magnets positioned for positioning the secondary rotor, when stationary, in a desired position for influencing the direction of rotation of the secondary rotor at subsequent start-up.

28. The method of claim 22, wherein the secondary rotor has a smaller radius than the primary rotor.

29. The method of claim 22, wherein the secondary rotor has a larger radius than the primary rotor.

* * * * *